(12) United States Patent
Sallwasser

(10) Patent No.: US 8,925,213 B2
(45) Date of Patent: Jan. 6, 2015

(54) WELLBORE CALIPER WITH MAXIMUM DIAMETER SEEKING FEATURE

(75) Inventor: Alan J. Sallwasser, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 115 days.

(21) Appl. No.: 13/597,659

(22) Filed: Aug. 29, 2012

(65) Prior Publication Data

US 2014/0059874 A1 Mar. 6, 2014

(51) Int. Cl.
| | | |
|---|---|---|
| *G01B 1/00* | (2006.01) | |
| *G01B 3/00* | (2006.01) | |
| *G01B 5/00* | (2006.01) | |
| *E21B 47/08* | (2012.01) | |
| *E21B 33/124* | (2006.01) | |
| *G01B 5/12* | (2006.01) | |
| *G01B 5/08* | (2006.01) | |
| *G01M 3/00* | (2006.01) | |
| *G01B 7/13* | (2006.01) | |

(52) U.S. Cl.
CPC ............... *E21B 47/08* (2013.01); *E21B 33/124* (2013.01); *G01B 5/12* (2013.01); *G01B 5/08* (2013.01); *G01M 3/005* (2013.01); *G01B 7/13* (2013.01)

USPC .......................................... 33/544.3; 33/544.2

(58) Field of Classification Search
CPC ......... E21B 47/08; E21B 33/124; G01B 5/12; G01B 7/13; G01B 7/281; G01B 5/08; G01M 3/005
USPC ................................................ 33/544.2, 544.3
See application file for complete search history.

(56) References Cited

U.S. PATENT DOCUMENTS

| | | | |
|---|---|---|---|
| 2,102,080 A | | 12/1937 | Kinley |
| 2,815,578 A | * | 12/1957 | Broussard .................... 33/544.3 |
| 4,529,877 A | | 7/1985 | Arnold |
| 4,914,826 A | * | 4/1990 | Nold, III ......................... 33/544 |
| 6,647,637 B2 | | 11/2003 | Lechen |
| 7,252,143 B2 | | 8/2007 | Sellers et al. |
| 7,669,668 B2 | | 3/2010 | Martinez et al. |
| 7,828,066 B2 | | 11/2010 | Jahn |
| 2009/0194284 A1 | * | 8/2009 | Jahn .............................. 166/298 |
| 2010/0319991 A1 | * | 12/2010 | Brannigan et al. ............... 175/40 |
| 2012/0055711 A1 | | 3/2012 | Brannigan et al. |

* cited by examiner

*Primary Examiner* — Peter Macchiarolo
*Assistant Examiner* — Rhyan C Lange
(74) *Attorney, Agent, or Firm* — Trevor Grove

(57) ABSTRACT

A wellbore caliper includes an actuator housing pivotally connected at one end to a well logging instrument housing and an actuator disposed in the housing and operable to extend and retract laterally extensible measuring arms.

19 Claims, 13 Drawing Sheets

WELLBORE CALIPER WITH MAXIMUM DIAMETER SEEKING FEATURE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This disclosure relates generally to the field of calipers used to measure internal dimensions of wellbores drilled through subsurface formations. More specifically, the disclosure relates to calipers with features to assist in seeking the largest internal dimension of a wellbore even under conditions of a well logging instrument "string" being held toward a bottom of the wellbore by gravity Various forms of calipers are known in the art for measuring internal diameter of a wellbore drilled through subsurface formations. Examples of calipers are described in U.S. Pat. No. 4,914,826, "Decentralized Well Logging Apparatus for Measuring the diameter of a Borehole Along Its Perpendicular Diametrical Axis", issued to Nold, and U.S. Pat. No. 2,102,080, Well Surveying Device, issued to M. M. Kinley. Other calipers may be associated with various sensors, for example gamma-gamma density sensors or "dipmeter" or formation imaging sensors. See, e.g., U.S. Pat. No. 4,529,877 issued to Arnold.

There continues to be a need for calipers that can seek a largest diameter of the wellbore even when the instrument string is drawn to the bottom (lower side) of the wellbore by gravity.

SUMMARY

A wellbore caliper includes an actuator housing pivotally connected at one end to a well logging instrument housing and an actuator disposed in the housing and operable to extend and retract laterally extensible measuring arms.

Other aspects and advantages of the invention will be apparent from the description and claims which follow.

DETAILED DESCRIPTION

Figure 1:
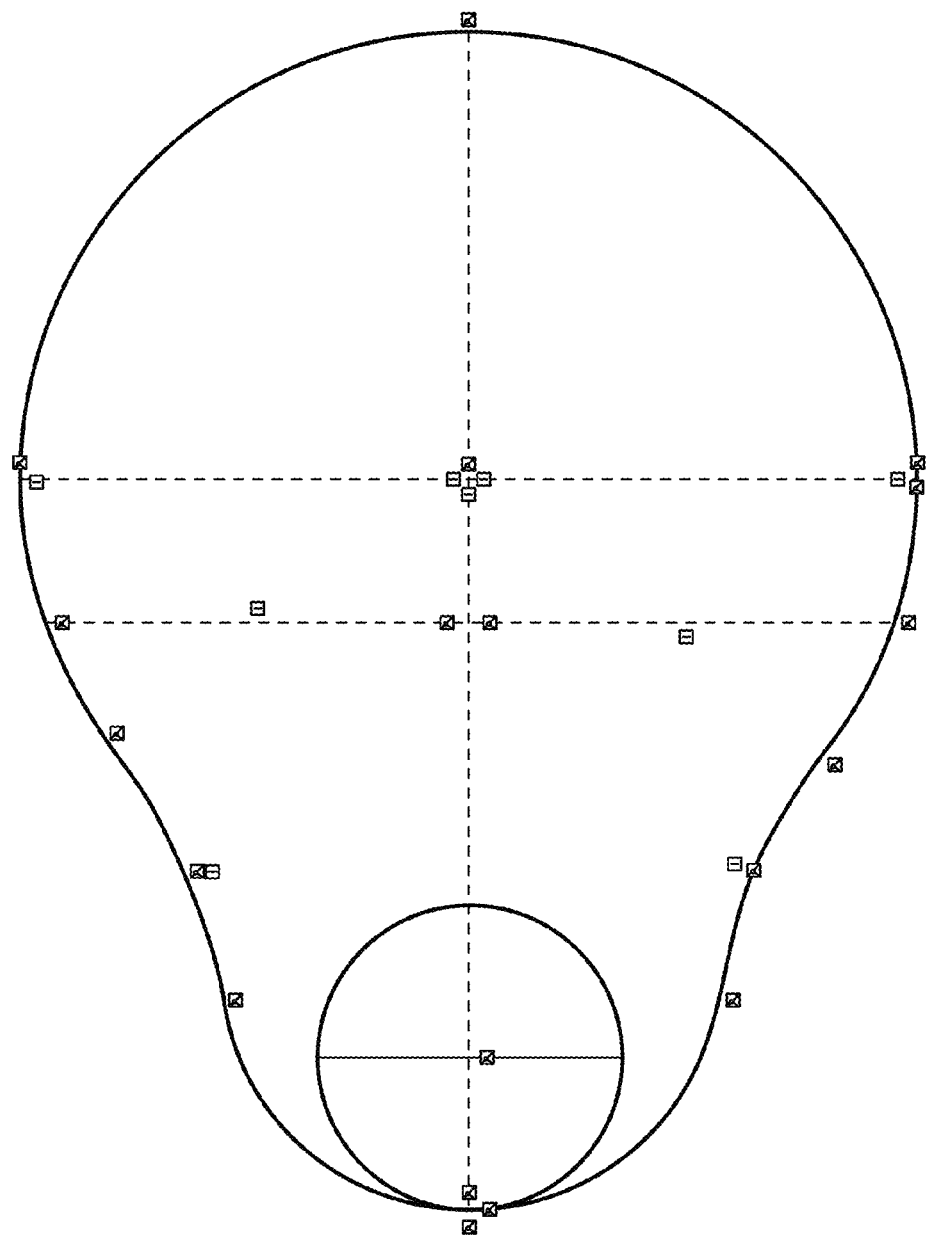
FIG. 1 shows an example of a ground out wellbore having a nominal diameter of 6.25 inches.

FIG. 1 shows a cross section of an example wellbore, drilled with a 6.25 inch diameter bit that may have become ground out toward the bottom of the wellbore by rotation of drill pipe, sliding of drill pipe during movement of the pipe in and out of the wellbore, and movement of various tools and instruments along the wellbore. In cases where the wellbore is highly inclined from vertical, or even horizontal, gravity can increase the effects which create wellbore cross-sectional shapes such as shown in FIG. 1.

Figure 2:
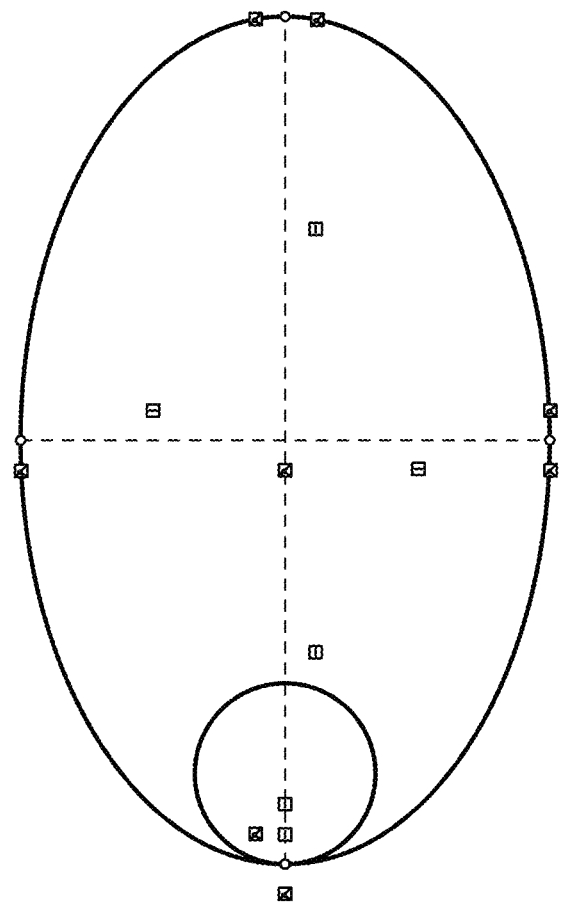
FIGS. 2 and 3 show examples of wellbores that have become ovalized from a nominal round hole diameter of 6.25 inches.
Figure 3:
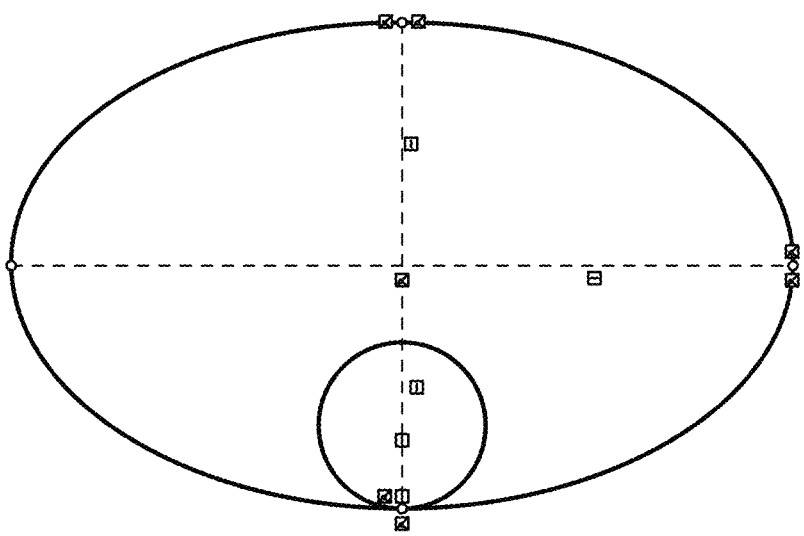

FIGS. 2 and 3 show cross-sections of wellbores that have become oval-shaped, again by action of drilling tools, drill pipe and other effects.

Figure 4:
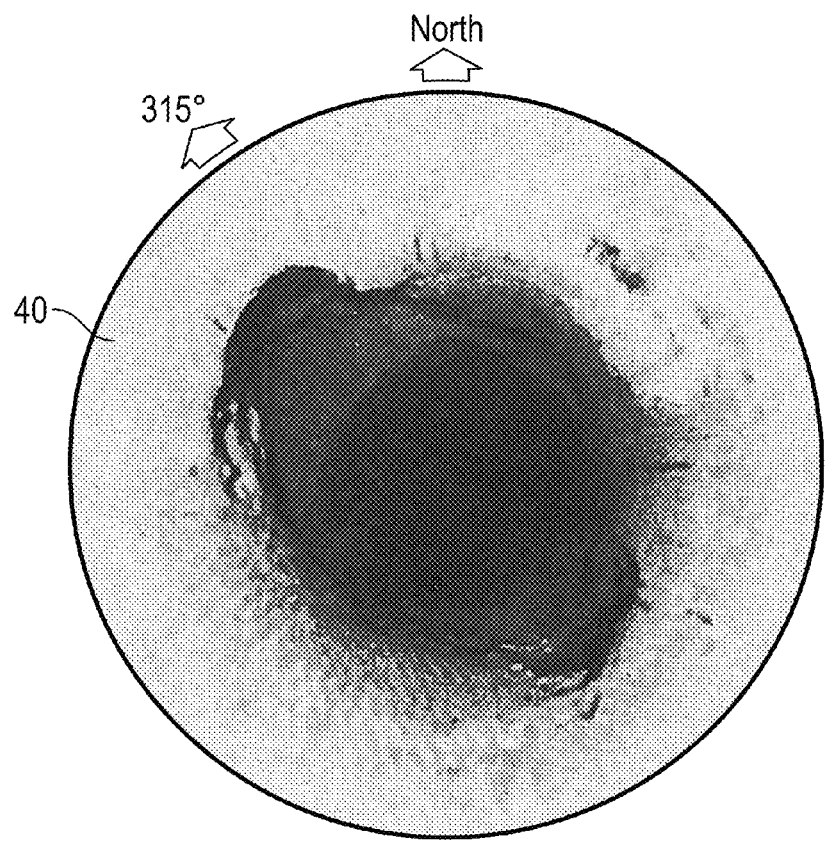
FIG. 4 shows an example of a wellbore haying ovalization caused by tectonic stresses in the formation released by drilling therethrough and subsequent fracturing.

FIG. 4 shows an example of a core 40 from an actual wellbore showing evidence of rock failure and subsequent diameter enlargement along a particular stress axis, e.g., 315 degrees from North as shown in FIG. 4.

Figure 5:
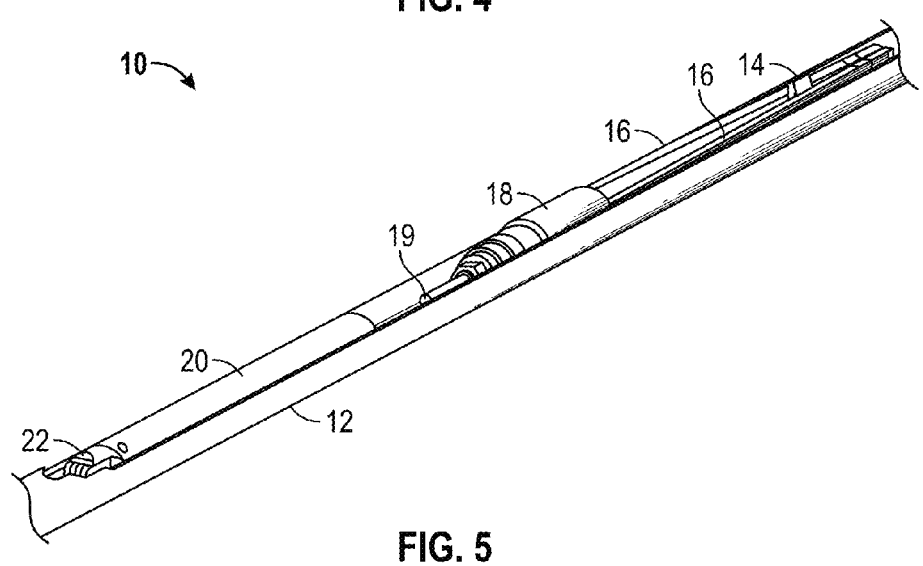
FIG. 5 shows an example caliper with measuring arms in the closed position.
Figure 6:
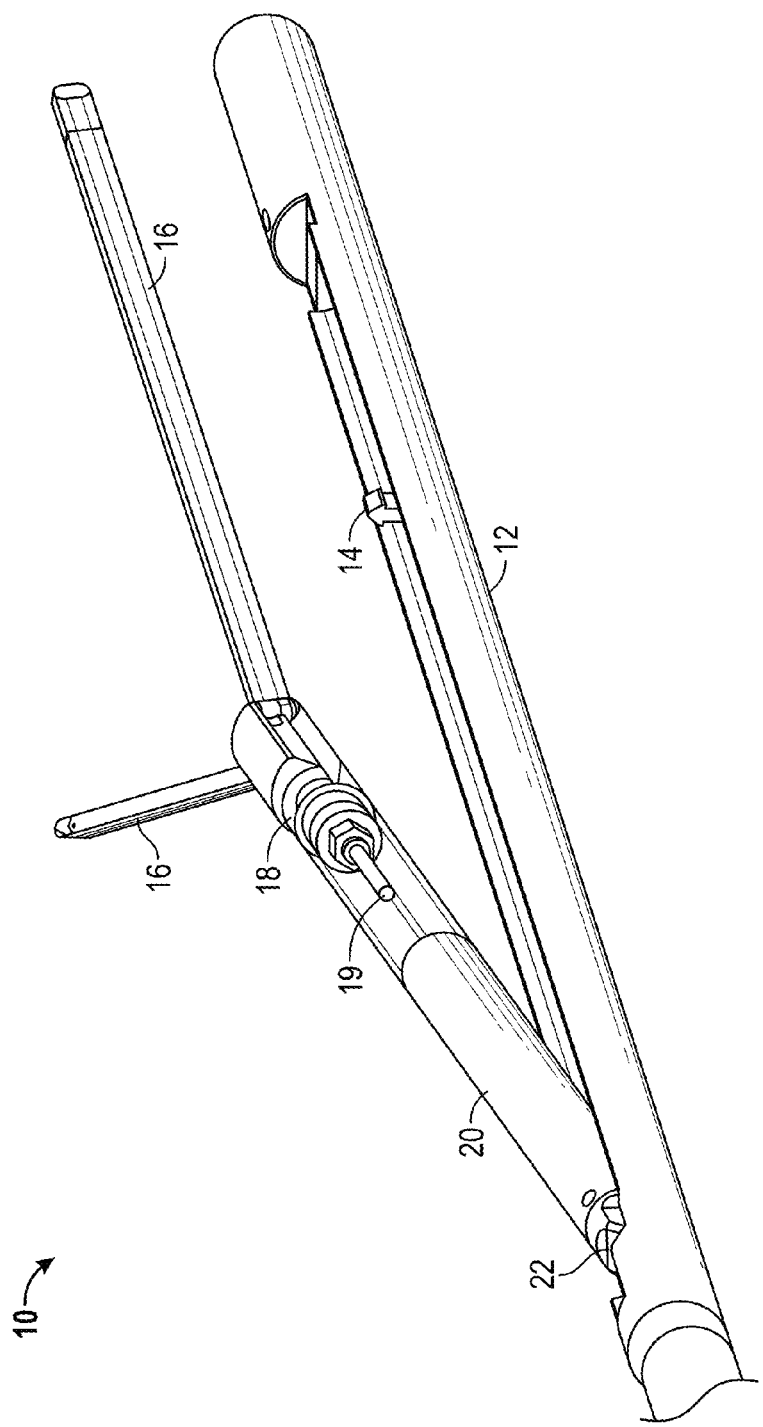
FIG. 6 shows the example caliper of FIG. 5 with the measuring arms in the open position.
Figure 6A:
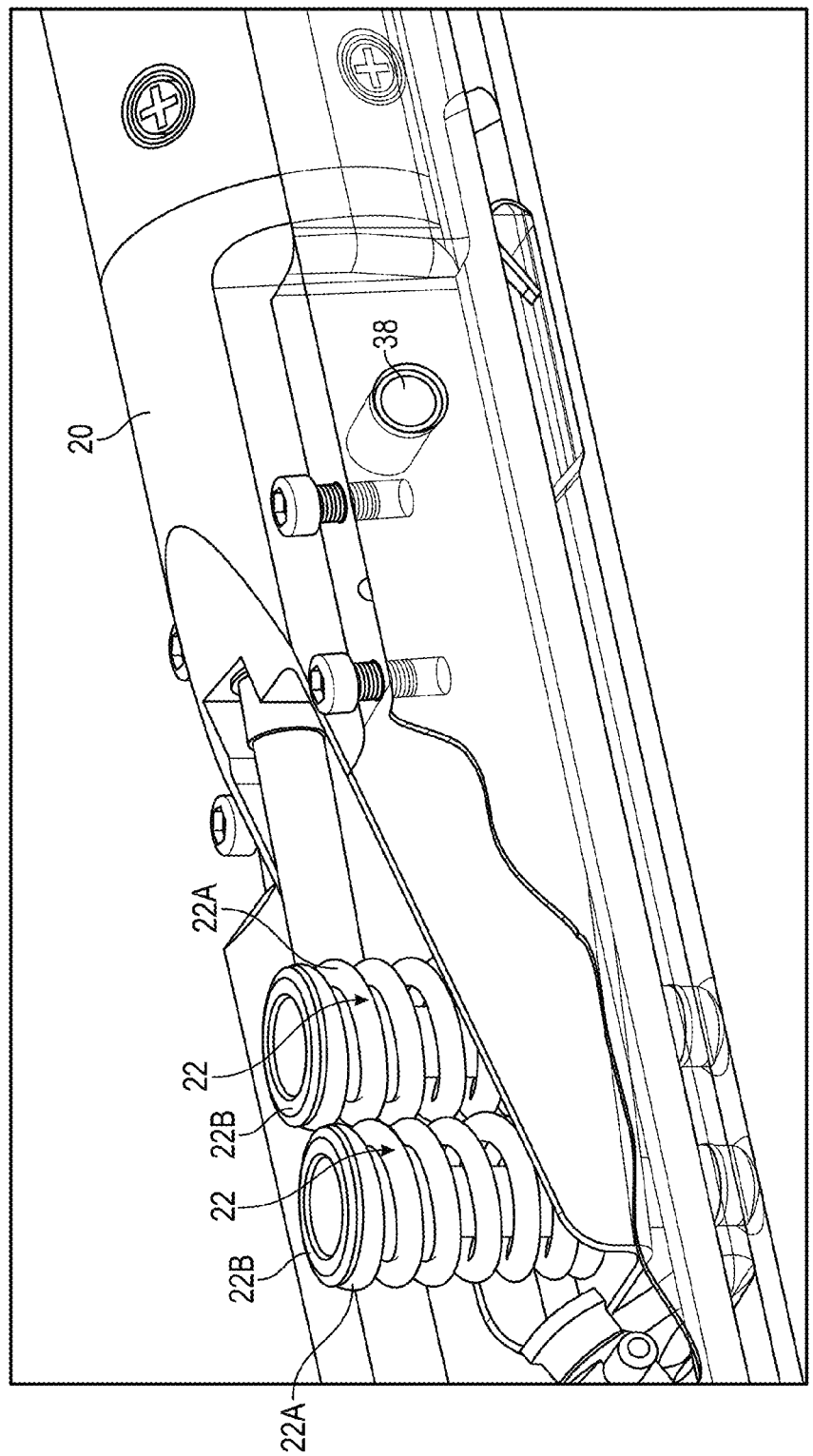
FIG. 6A shows an example adjustable spring to provide lift to the actuator housing.

FIGS. 5 and 6 show, respectively, closed and open positions of a caliper that may measure the largest internal diameter of wellbores such as those shown in FIGS. 1 through 4. The caliper 10 may form part of a gamma-gamma density instrument, the skid or chassis 12 of which may engage the gravitationally lowest side of a wellbore in wellbores that are not vertical. The skid or chassis 12, however may exclude such density measuring devices. An actuator housing 20 may be coupled to the skid with a pivot and spring combination 22. The pivot and spring 22 may enable the actuator housing to pivot upwardly at the end opposite the pivot and spring 22. The spring (not shown separately in FIGS. 5 and 6) may have adjustable force so that when submerged in drilling fluid in a wellbore, the actuator housing 20 and associated hardware 19, 18 and 16 (explained further below) may be substantially neutrally buoyant. The user may adjust the spring 22 force to reflect the density of the fluid in the wellbore for such purpose. A more detailed view of an spring and pivot combination is shown in FIG. 6A. The actuator housing 20 may be coupled to the chassis 12 using a pivot pin 38 (see FIG. 8) such that the longitudinal axis of the actuator housing 20 may be angularly deflected with respect to the longitudinal axis of the chassis 12. A selectable amount of deflecting force may be applied to the actuator housing 20 by a spring assembly 22. In the present example, the spring assembly 22 may include one or more coil springs 22A that may apply force against that part of the actuator housing 20 across the pivot pin 38, thus urging the actuator housing 20 away from the chassis 12. An amount of spring force may be selected by an adjuster 22B associated with each spring. The adjusters 22B may be cup type spring retainers engaged within a corresponding threaded hole (not shown) in part of the chassis 12. Rotating the adjusters 22B may thus change the uncompressed height of the coil springs 22A, thereby applying a selected amount of lifting force to the actuator housing 20. In some examples, the adjusters 22B may be set so that the actuator housing 20 and attached components may be substantially neutrally buoyant in the drilling fluid in a wellbore (FIG. 11) based on the fluid density and the expected inclination of the wellbore.

Figure 6B:
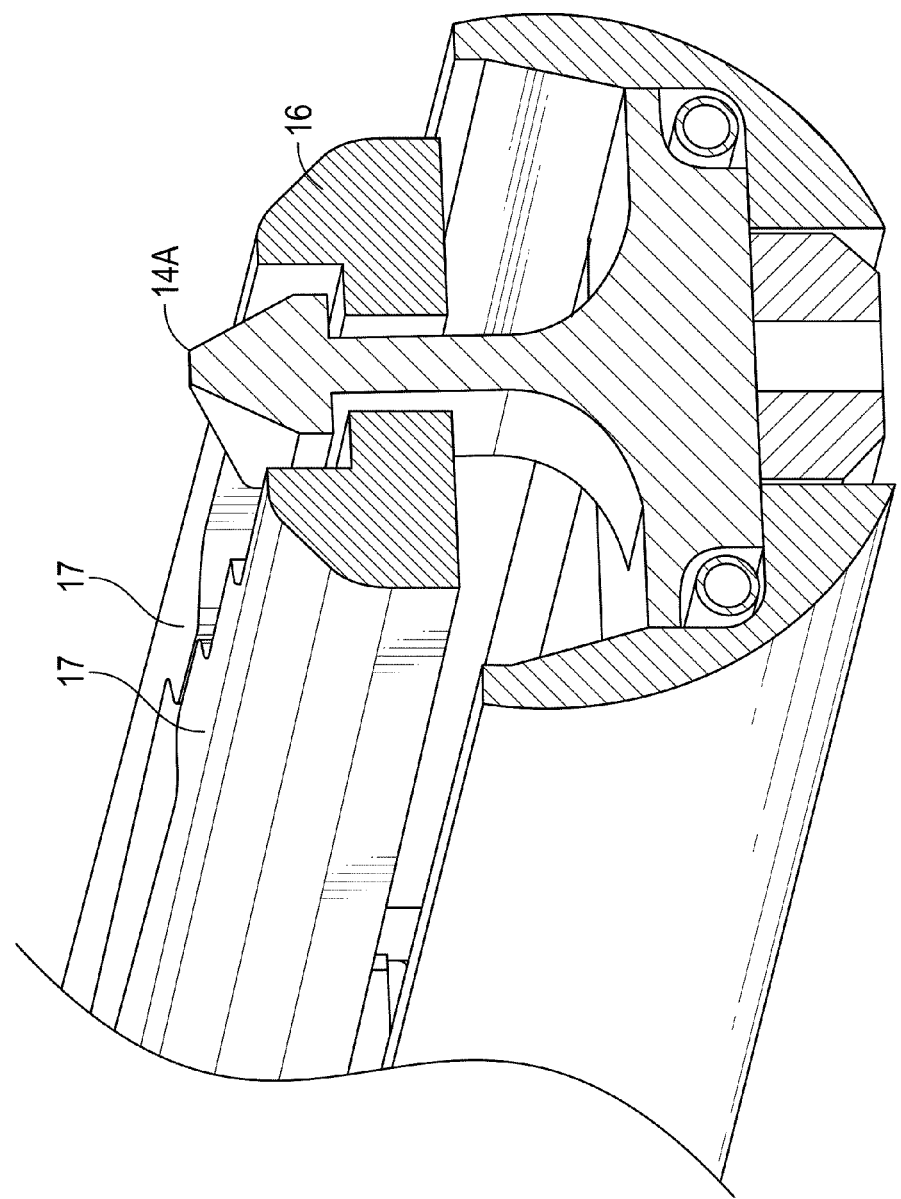
FIGS. 6B through 6D show various views of features in the measuring arms to provide suitable operation of a latch.
Figure 6C:
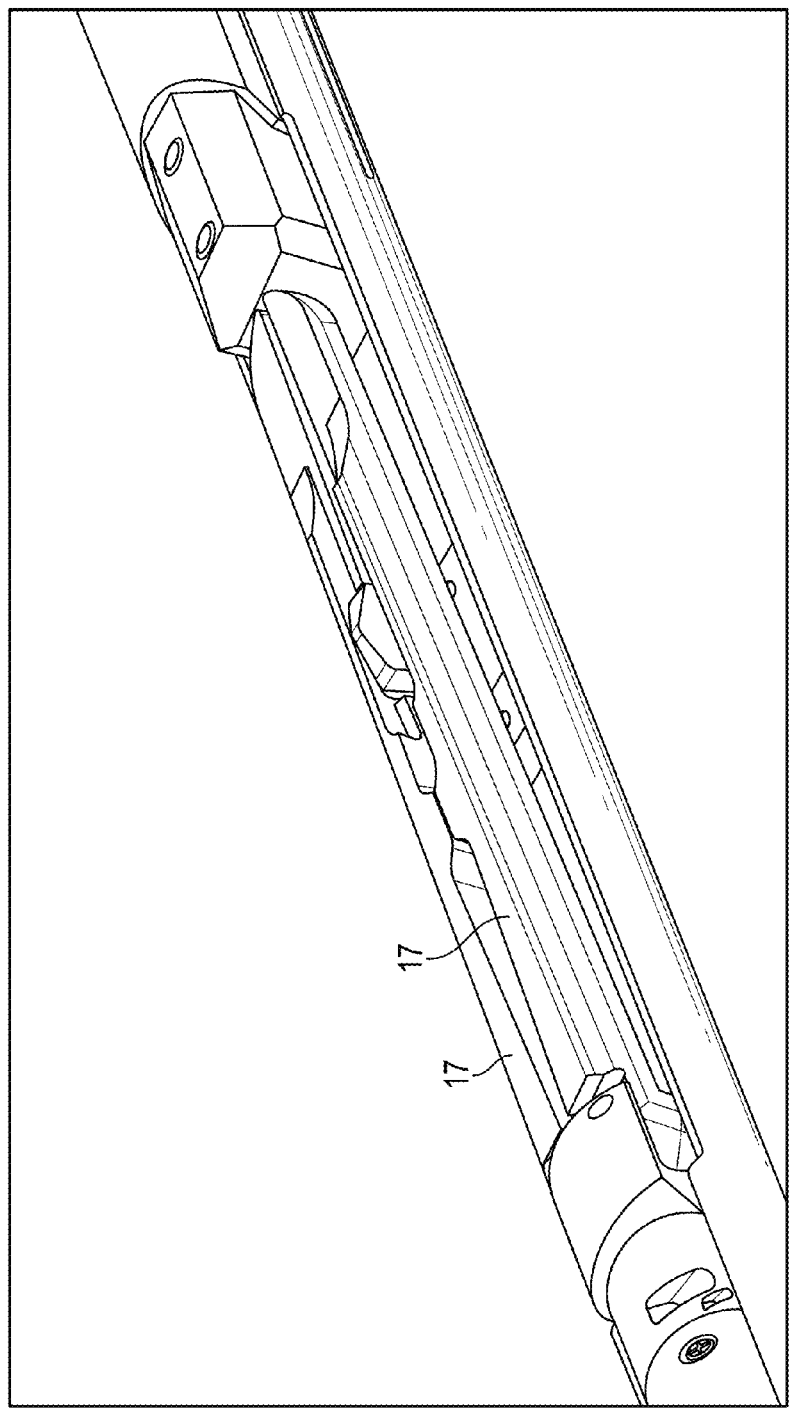
Figure 6D:
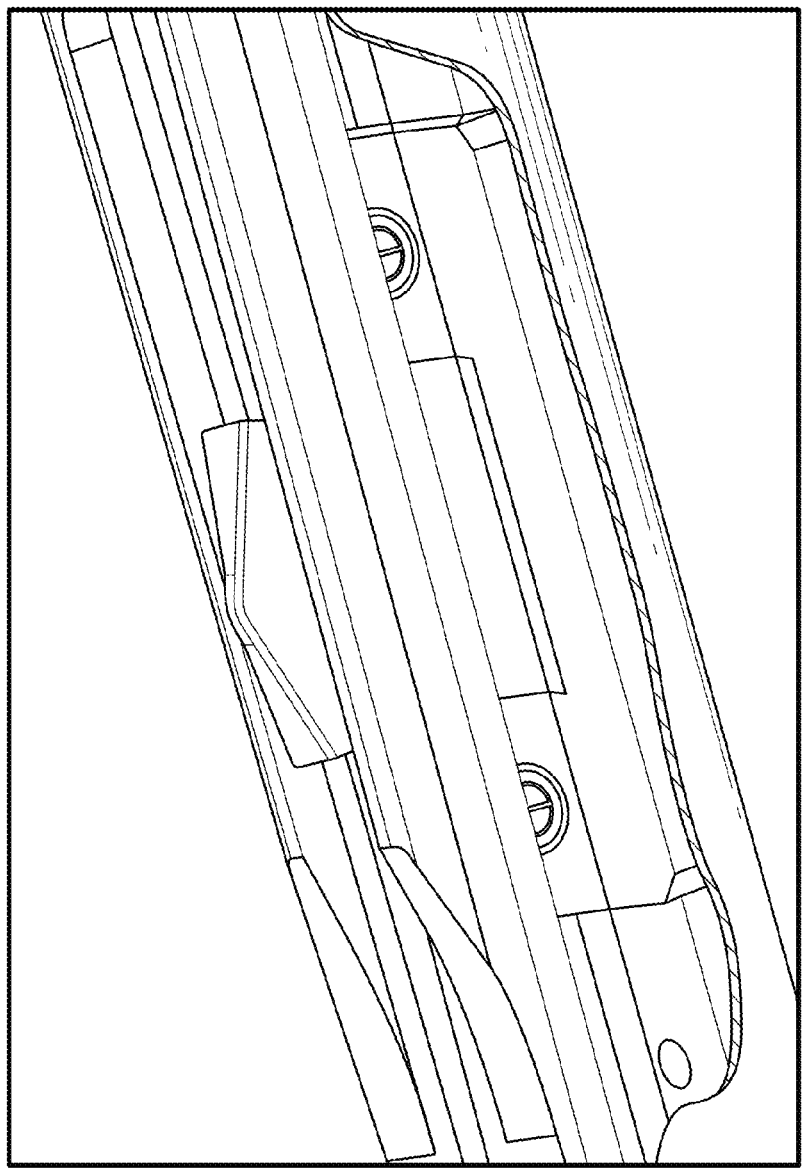

FIGS. 6B through 6D show the measuring arms 16 in the closed position to illustrate features enabling operation of the latch 14. A portion of each measuring arm 16 proximate the longitudinal position of the latch may be shaped to fit around a portion of the latch 14 below a wider portion 14 on the upper portion of the latch when the arms 16 are closed. The arms may each have a stop feature 17 at a longitudinal position away front the latch 14 so that the arms 16 cannot fully close around the latch 14 but may be retained from outward movement by the top 14A of the latch. When the arms 16 are opened by the actuator (FIG. 6), the arms are no longer retained by the latch 14 and the actuator housing is free to pivot outwardly as explained with reference to FIG. 6.

To return the actuator housing to its fully inwardly pivoted position against the chassis (FIG. 5), after full retraction of the actuator 20, it may be possible to draw the caliper tool 10 through a selected diameter opening so that the arms 16 engage the latch 14. Such operation may enable the caliper tool to be lowered into the wellbore (FIG. 10) another time. Otherwise, the caliper tool may only move in an upward direction (out of the wellbore) after the arms 16 are allowed to open for the first time.

An actuator linkage 18 may be disposed at the opposite end of the actuator housing 20. An actuator rod 19 may be disposed inside the actuator housing 20 and may be withdrawn, for example by an hydraulic cylinder/piston combination or a motor/screw/ballnut combination (none shown in FIGS. 5 and 6) in order to close the caliper 10. When the caliper 10 is closed (FIG. 5) caliper measuring arms 16 may be restrained by a catch 14 or similar latch that may engage mating features in the measuring arms 16.

Figure 7:
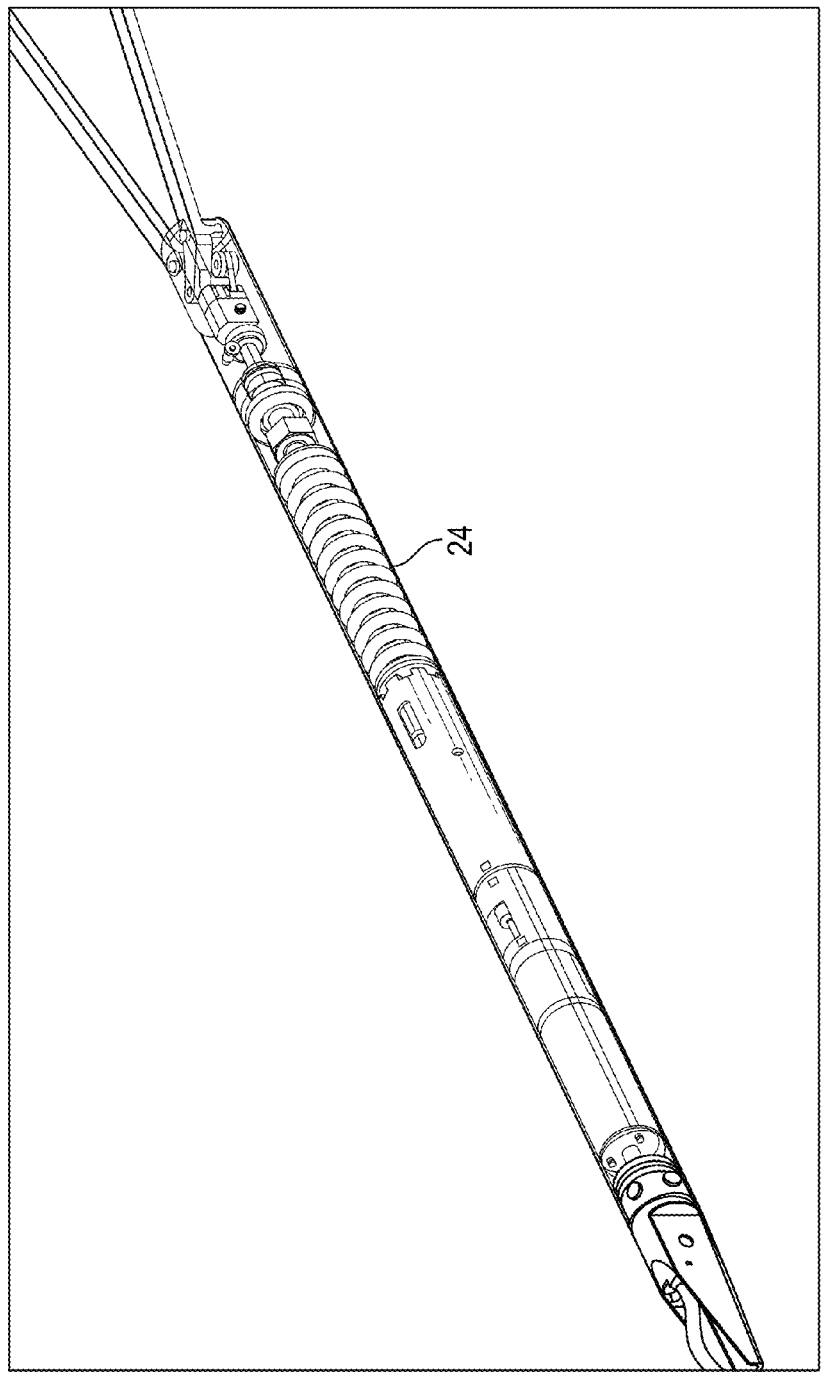
FIG. 7 shows a cut away view of the caliper measurement housing including an example biasing element.

FIG. 7 shows an example biasing element 24, such as a spring, which may be used to move the actuator rod (19 in FIG. 6) outwardly from the actuator housing 20 in order to open the caliper 10.

Figure 8:
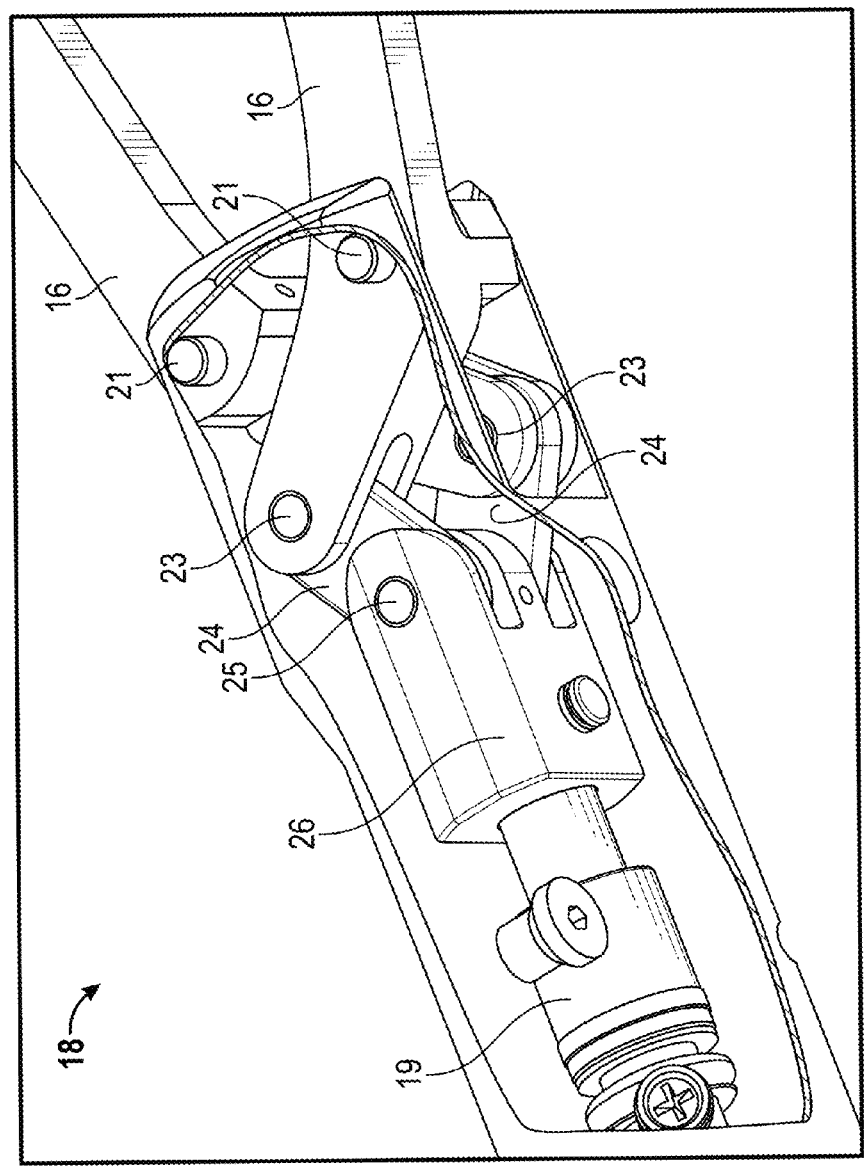
FIG. 8 shows an example linkage between the measuring arms and a caliper measurement transfer rod.

FIG. 8 shows an example actuator linkage 18 to connect the actuator rod 19 to the measuring arms 16 so that force from the biasing element can be transferred through the actuator rod 19 to cause the measuring arms 16 to pivotally open laterally away from the longitudinal axis of the caliper 10. A first linkage head 26 may he coupled at one end, e.g., by a set screw, roll pin or the like to the end of the actuator rod 19. The first linkage head may include a first pivot pin 25 disposed proximate its other end in a direction transverse to the motion of the actuator rod 19. First pivot links 24 may be arranged in corresponding slots in the first linkage head 26 and be rotatable about the first pivot pin 25. An end of each measuring arm 16 may include a slot and receptacle to receive a second pivot pin 23. Each measuring arm 16 may be pivotally coupled to the chassis (12 in FIG. 1) with a third pivot pin 21 so that extension of the actuator rod 19 may cause laterally outward movement of the measuring arms 16. Diameter of the wellbore may be inferred by the longitudinal position of the actuator rod 19, because the foregoing described linkage elements enable direct correlation of caliper arm extension to actuator position. The actuator rod 19 may be coupled to a position measuring device such as a linear variable differential transformer (not shown in FIG. 8) or any similar linear position determination device. In other examples, a rotary position encoder (not shown) may be coupled to the pivoted portion, i.e., proximate third pivot pin 21, of one or both measuring arms 16 to infer the diameter of the wellbore.

During operation of the caliper in a wellbore, the biasing element (24 in FIG. 7) urges the actuator rod (19 in FIG. 6) outward, which in turn urges the measuring arms (16 in FIG. 8) to extend laterally. Because the actuator housing (20 in FIG. 6) may be substantially neutrally buoyant in the drilling fluid in the wellbore, it may be enabled to "float" with movement of the measuring arms (16 in FIG. 8) upward and downward with respect to the cross section of the wellbore. Thus, the measuring arms (16 in FIG. 8) may be free to move to the largest diameter part of the wellbore and make a measurement of such diameter.

Figure 9:
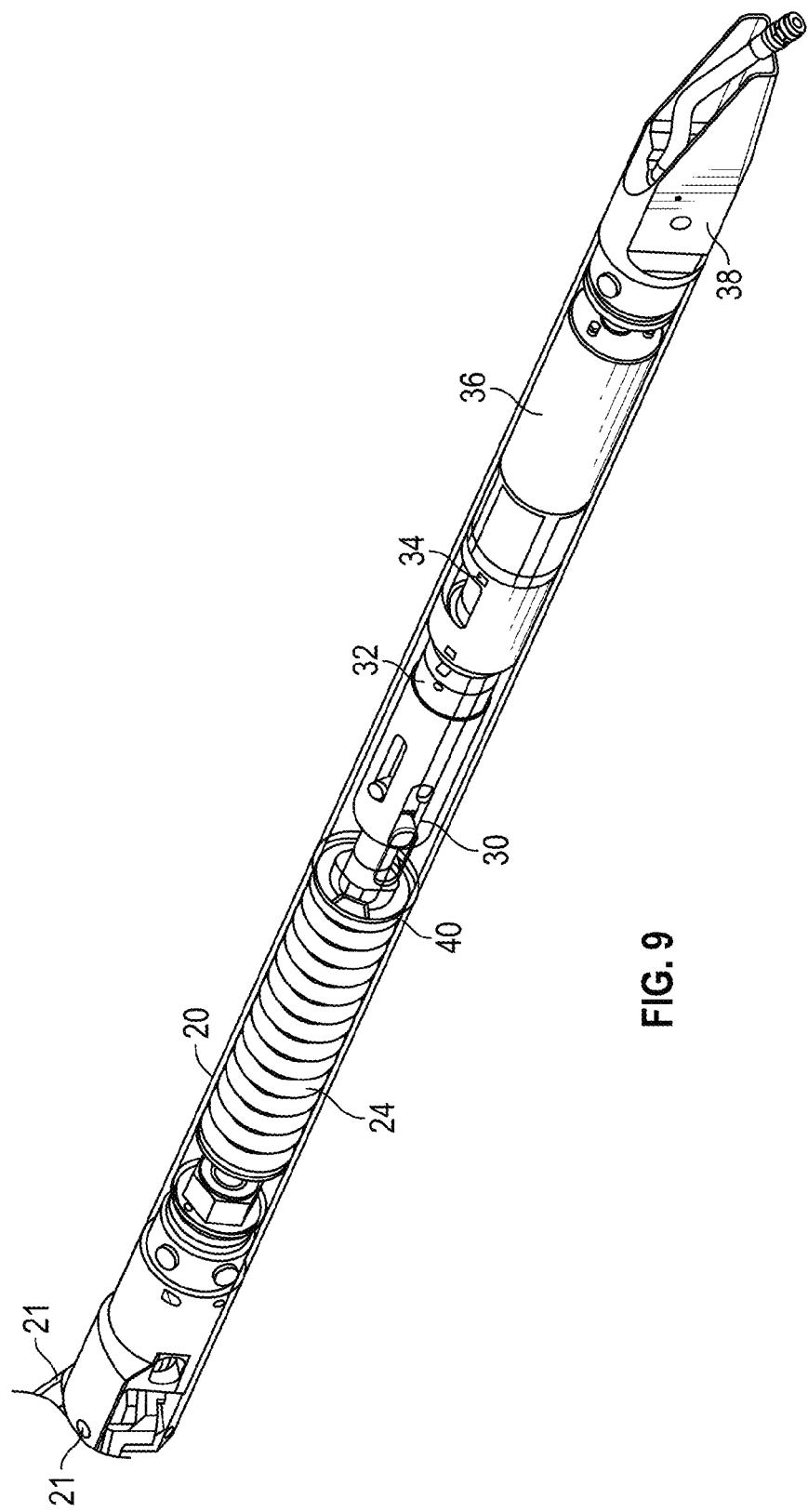
FIGS. 9 and 10 show an example actuator in more detail.
Figure 10:
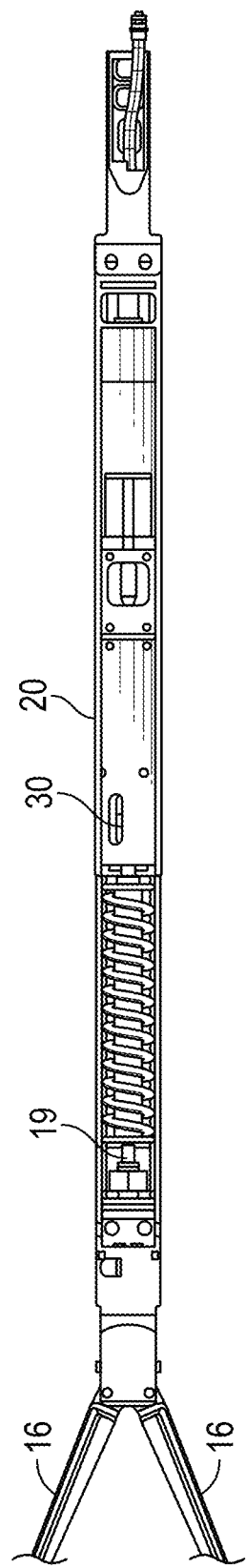

FIGS. 9 and 10 show an example actuator in more detail. A motor 36, such as an electric motor, may be disposed in the actuator housing proximate its upper end. A coupling 34 may join the motor 30 to a ball screw 32. Rotation of the motor 30 will act on the ball screw to cause it to move longitudinally within the actuator housing. Such action may be used to retract the actuator rod 19 to close the caliper 10. The ball screw may be coupled to the spring 24 and actuator rod using a slip joint 30. A pivot pin 38 allows the actuator housing 20 to lift, as shown in FIG. 6. A position sensor may be located such as shown at 40.

Figure 11:
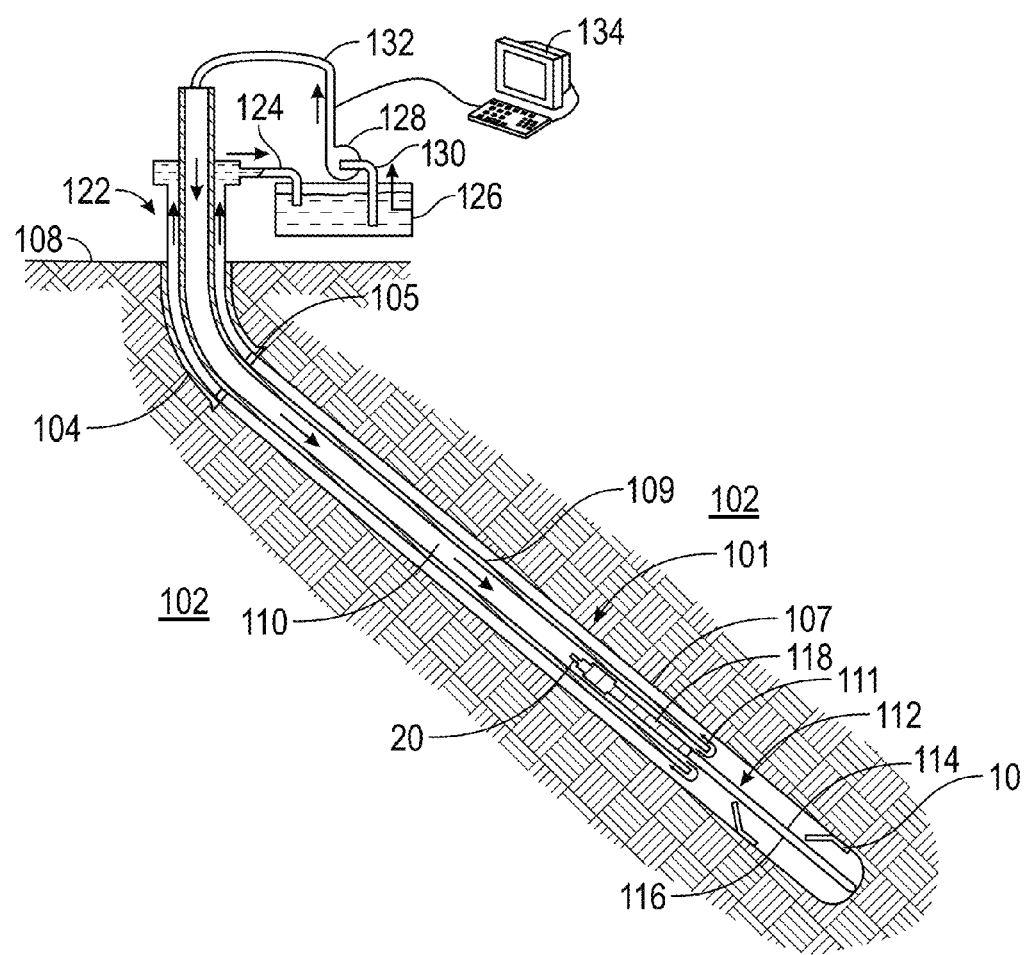
FIG. 11 shows an example well logging instrument system including an example caliper.

FIG. 11 shows a wellbore 101 formed in an earth formation 102, the wellbore 101 being filled with drilling fluid. The wellbore 101 may have an upper portion provided with a casing 104 extending from a drilling rig (not shown) at the surface 108 into the wellbore 101 to a casing shoe 105, and an open lower portion 107 extending below the casing shoe 105. A tubular drill string 109 containing a body of drilling fluid 110 and having an open lower end 111 may extend from the drilling rig into the wellbore 101 whereby the open lower end 111 is arranged in the open lower wellbore portion 107. A logging tool string 112 capable of being lowered or raised through the drill string 109, may be retrievably suspended in the drill string 109 by suitable means (not shown). The logging string 112 may include various well logging instrument sensors, including, without limitation, gamma ray sensors, resistivity sensors, acoustic sensors, neutron sensors and density sensors. The logging string may include a density sensor 114 having a caliper 10 as explained above, and a fluid pressure pulse device 118 arranged at the upper side of the logging tool string 112, whereby the logging tool string 112 extends below the lower end part 111 of the drill string 109 and the pressure pulse device 118 is arranged within the drill string 109. The density tool 114 may be powered by a battery (not shown) and may be provided with an electronic memory (not shown) for storing logging data. The fluid pressure pulse device 118, if used, has a variable flow restriction (not shown) which is controlled by electric signals transmitted by the logging tool string 112 to the pressure pulse device 118, which signals represent part of the logging, data produced by the logging tool string 112 during logging of the earth formation 102. The upper end of the logging tool string 112 may be provided with a latch 120 for latching of a wireline (not shown) to the string 112. A wellhead 122 may be connected to the upper end of the casing 104 and is provided with an outlet conduit 124 debouching in a drilling fluid reservoir 126 provided with a suitable sieve means (not shown) for removing drill cuttings from the drilling fluid. A pump 128 having an inlet 130 and an outlet 132 is arranged to pump drilling fluid from the fluid reservoir 126 into the upper end of the drill string 109. A control system 134 located at surface is connected to the drill string 109 for sending or receiving fluid pressure pulses in the body of drilling fluid 110 to or from the fluid pressure pulse device 118. It should be clearly understood that the example logging tool string, its manner of conveyance into the wellbore, and the presence of casing in any part of the wellbore are meant only to serve as examples and are not intended to limit the scope of this disclosure. Any means known in the art for conveying a logging tool or logging tool string into a wellbore, such as coiled tubing, wireline, slickline, tubing, etc. may be used with a caliper and/or logging tool string as described above.

A caliper according to the present example may be able to measure the largest internal diameter of an out of round wellbore, particularly in cases of highly inclined or horizontal wells that have been made out of round as explained with reference to FIGS. 1-4.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A wellbore caliper, comprising:
   an actuator housing pivotally connected at one end to a well logging instrument housing;
   an actuator disposed in the housing and operable to extend and retract laterally extensible measuring arms; and
   an adjustable spring cooperatively engaged with the pivotal connection such that the actuator housing is substantially neutrally buoyant in the wellbore.

2. The caliper of claim 1 wherein the actuator comprises a motor and ball screw.

3. The caliper of claim 1 wherein the actuator comprises a biasing element.

4. The caliper of claim 3 wherein the biasing element comprises a spring.

5. The caliper of claim 1 further comprising a latch disposed between the measuring arms, the latch configured to retain the measuring arms in a closed position.

6. The caliper of claim 1 further comprising an actuator rod coupled to the actuator and arranged to move longitudinally with respect to the actuator housing.

7. The caliper of claim 5 further comprising a linkage coupled to one end of the actuator rod, the linkage configured to translate longitudinal motion of the actuator into lateral motion of the measuring arms.

8. The caliper of claim 1 further comprising a position sensor operatively coupled to the actuator.

9. The caliper of claim 7 wherein the position sensor comprises a linear variable differential transformer.

10. A method for well logging, comprising:
    moving a well logging tool along an interior of a wellbore drilled through formations, the well logging tool comprising a caliper, the caliper comprising an actuator housing pivotally connected at one end to a well logging instrument housing, an actuator disposed in the housing and operable to extend and retract laterally extensible measuring arms; and
    measuring an internal dimension of the wellbore by determining a lateral extension of the measuring arms; and
    an adjustable spring cooperatively engaged with the pivotal connection such that the actuator housing is substantially neutrally buoyant in the wellbore.

11. The method of claim 10 wherein the actuator comprises a motor and ball screw.

12. The method of claim 10 wherein the actuator comprises a biasing element.

13. The method of claim 12 wherein the biasing element comprises a spring.

14. The method of claim 10 further comprising a latch disposed between the measuring arms, the latch configured to retain the measuring arms in a closed position.

15. The method of claim 14 further comprising moving the caliper tool through a selected diameter opening to close the arms about the latch and to return the actuator housing to a fully retracted position against a chassis of the caliper tool.

16. The method of claim 10 further comprising moving an actuator rod coupled to the actuator and arranged to move longitudinally with respect to the actuator housing.

17. The method of claim 15 further comprising moving a linkage coupled to one end of the actuator rod, the linkage configured to translate longitudinal motion of the actuator into lateral motion of the measuring arms.

18. The method of claim 16 further comprising determining a position of the actuator using a position sensor operatively coupled to the actuator.

19. The method of claim 16 wherein the position sensor comprises a linear variable differential transformer.

* * * * *